United States Patent
Park et al.

(10) Patent No.: US 7,171,060 B2
(45) Date of Patent: Jan. 30, 2007

(54) METHOD OF PERCEPTUAL 3D SHAPE DESCRIPTION AND METHOD AND APPARATUS FOR SEARCHING 3D GRAPHICS MODEL DATABASE USING THE DESCRIPTION METHOD

(75) Inventors: In-kyu Park, Seoul (KR); Do-kyoon Kim, Gyeonggi-do (KR); Sang-uk Lee, Seoul (KR); Il-dong Yun, Kyungki-do (KR); Duck-hoon Kim, Seoul (KR)

(73) Assignees: Samsung Electronics Co., Ltd., Suwon-Si (KR); Seoul National University Industry Foundation, Seoul (KR)

( * ) Notice: Subject to any disclaimer, the term of this patent is extended or adjusted under 35 U.S.C. 154(b) by 409 days.

(21) Appl. No.: 10/727,660

(22) Filed: Dec. 5, 2003

(65) Prior Publication Data

US 2004/0150640 A1    Aug. 5, 2004

Related U.S. Application Data

(60) Provisional application No. 60/510,147, filed on Oct. 14, 2003, provisional application No. 60/430,974, filed on Dec. 5, 2002.

(30) Foreign Application Priority Data

Nov. 25, 2003  (KR) ....................... 10-2003-0084215

(51) Int. Cl.
*G06K 9/54* (2006.01)
*G06K 9/00* (2006.01)
*G06T 15/00* (2006.01)

(52) U.S. Cl. ..................... 382/305; 382/154; 345/419

(58) Field of Classification Search ................ 382/154, 382/209, 218, 305; 345/419–420; 358/403; 707/3

See application file for complete search history.

(56) References Cited

U.S. PATENT DOCUMENTS 5,982,923 A * 11/1999 Kim et al. .................. 382/154

(Continued)

OTHER PUBLICATIONS

Han, et al. "3D Sketch: Modeling by digitizing with a smart 3D pen", ACM, pp. 41-49, 1997.*

(Continued)

*Primary Examiner*—Daniel Mariam
(74) *Attorney, Agent, or Firm*—Buchanan Ingersoll & Rooney PC

(57) ABSTRACT

A method of perceptual 3-dimensional (3D) shape description and a method and apparatus for searching a perceptual 3D graphics model database established using the description method are provided. The description method includes: generating nodes that respectively correspond to parts of a part-based representation of a 3D shape model, the nodes including unary attributes of the parts; generating edges that include relational attributes between the nodes; and generating an attributed relational graph of the 3D shape model that is comprised of the nodes and the edges. The search method includes: receiving a predetermined 3D graphics model; transforming the received 3D graphics model into a perceptual 3D shape descriptor; and comparing the perceptual 3D shape descriptor with each of the perceptual 3D graphics models stored in the database to retrieve the 3D graphic models that are similar to the perceptual 3D shape descriptor. The searching apparatus includes: a query input unit that receives a query that is a 3D graphics model; a model/shape descriptor transforming unit that transforms the 3D graphic model received as the query into a perceptual 3D shape descriptor; a matching unit that compares the perceptual 3D shape descriptor with each of the perceptual 3D graphics models stored in the database to retrieve the models that are similar to the perceptual 3D shape descriptor; and a model output unit that outputs the retrieved model. A query by sketch or a query by editing is available, and the models that are similar to a query can be more accurately retrieved due to a double earth mover's distance method used to match query and model graphs.

19 Claims, 12 Drawing Sheets
(5 of 12 Drawing Sheet(s) Filed in Color)

U.S. PATENT DOCUMENTS

| | | | | |
|---|---|---|---|---|
| 6,323,863 | B1* | 11/2001 | Shinagawa et al. | 345/441 |
| 6,512,995 | B2* | 1/2003 | Murao | 702/167 |
| 2005/0002571 | A1* | 1/2005 | Hiraga et al. | 382/218 |
| 2005/0168460 | A1* | 8/2005 | Razdan et al. | 345/419 |

OTHER PUBLICATIONS

Shokoufandeh, et al. "View-based object matching", IEEE, pp. 588-595, 1998.*

Hilaga, et al. "Topology matching for fully automatic similarity estimation of 3D shapes", ACM, pp. 203-212, 2001.*

Bober "MPEG-7 visual shape descriptors", IEEE, pp. 716-719, 2001.*

Duck Hoon Kim et al., "Shape Decomposition Scheme By Combining Mathemathical Morphology and Convex Partitioning", The 5th Asian Conference on Computer Vision, 2002, pp. 1-6, ACCV2002, Melbourne, Australia.

Titus Zaharia et al., "3D Shape /Core Experiment: Semantic Versus Geometric Categorization of 3D Mesh Models", International Organisation for Standardisation, ISO/IEC JTC1/SC29/WG11, Coding of Moving Pictures and Audio, MPEG00/M6104, 2000, pp. 1-10, Geneva, Switzerland.

B.S. Manjuanth et al., "Multimedia Content Description Interface", Introduction to MPEG-7, 2002, pp. 182-184 and pp. 236-239, John Wiley & Sons, Ltd., Chichester, West Sussex, England.

In Kyu Park et al., "Perceptual 3D Shape Descriptor: Result of Core Experiment", International Organisation for Standardisation, ISO/IEC JTC1/SC29/WG11, Coding of Moving Pictures and Audio, MPEG2003/M10093, 2002, pp. 1-9, Brisbane, Australia.

Longin Jan Latecki et al., "Convexity Rule for Shape Decomposition Based on Discrete Contour Evolution", Computer Vision and Image Understanding, 1999, pp. 441-454, vol. 73, No. 3, Academic Press, New York, USA.

Titus Zaharia et al., "Results of 3D Shape Core Experiment", International Organisation for Standardisation, ISO/IEC JTC1/SC29/WG11, Coding of Moving Pictures and Audio, MPEG00/M6315, 2000, pp. 1-8, Beijing, China.

Johan W.H. Tangelder et al., "Polyhedral Model Retrieval Using Weighted Point Sets", Technical Report UU-CS-2002-019, 2002, pp. 19, Utrecht University.

Petros A. Maragos et al>, "Morphological Skelton Representation and Coding of Binary Images", IEEE Transactions on Acoustics Speech, and Signal Processing, 1986, pp. 1228-1244, vol. 34, No. 5.

In-Kyu Park et al., "Perceptual 3D Shape Descriptor: Result of Core Experiment", International Organisation for Standardisation, ISO/IEC JTC1/SC29/WG11, Coding of Moving Pictures and audio, MPEG2003/M9809, 2003, pp. 1-9, Trondheim, Norway.

Kaleem Siddiqi et al., "Shock Graphs and Shape Matching", International Journal of Computer Vision, 1999, pp. 13-32, Kluwer Academic Publishers, Netherlands.

Ioannis Pitas et al., "Morphological Shape Decomposition", IEE Transactions on pattern Analysis and Machine Intelligence, 1990, pp. 38-45, vol. 12, No. 1, IEEE.

Yossi Rubner et al., "The Earth Mover's Distance as a Metric for Image Retrieval", International Journal of Computer Vision, 2000, pp. 99-121, Kluwer Academic Publishers, The Netherlands.

Leszek Cieplinski et al., "MPEG-7 Visual Part of Experimentation Model Version 11.0", International Organisation for Standardisation, ISO/IEC JTC1/SC29/WG11/N4362, Coding of Moving Pictures and Associated Audio Information, 2001, pp. 1-91, Sydney, Australia.

T. Zaharia et al.: 3D-Shape-based retrieval within the MPEG-7 framework Proceedings of the SPIE—The International Society for Optical Engineering SPIE-Int. Soc. Opt. Eng USA, vol. 4304, 2001, pp. 133-145.

S. Bischoff et al: "Streaming 3D geometry data over lossy communication channels" Aug. 26, 2002 Multimedia and Expo, 2002 Proceedings 2002 IEEE International Conference on Lausanne, Switzerland Aug. 26-29, 2002, Piscataway, NJ, USA, IEEE, US, pp. 361-364.

G.M. Euripides, G.M. Petrakis: "Content-Based Retrieval of Medical Images" International Journal of Computer Research, vol. 11, No. 2, Jun. 30, 2002 pp. 171-182.

European Search Report dated Oct. 6, 2005.

* cited by examiner

FIG. 1
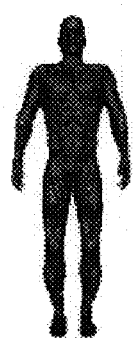
(a) 'android' MODEL
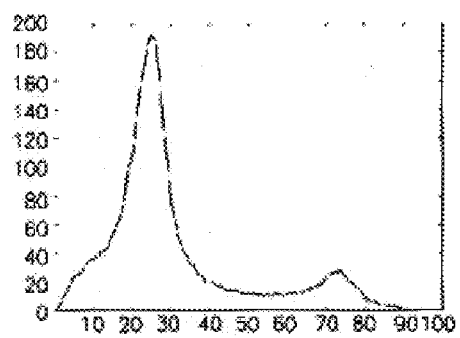
(b) SHAPE SPECTRUM OF 'android' MODEL
(c) 'crocodile' MODEL
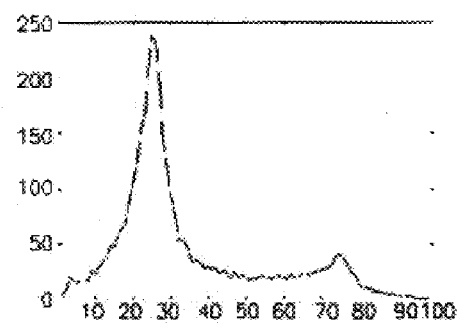
(d) SHAPE SPECTRUM OF 'crocodile' MODEL FIG. 3
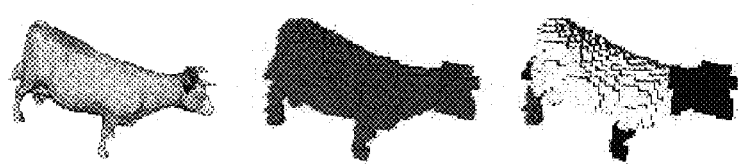
(a)  (b)  (c)
(d)  (e)  (f)

| P3DS { | Number of bits | Mnemonics |
|---|---|---|
| NNodes | 5 | uimsbf |
| for (i=0; i<NNodes-1; i++) {     for (j=i+1 ; j<NNodes; j++) { | | |
| IsAdjacent[i][j] | 1 | bslbf |
| } } | | |
| for (i=0; i<NNodes; i++) { | | |
| Volume[i] | 8 | uimsbf |
| Center[i][3] | 8 | uimsbf |
| Transform[i][6] | 8 | uimsbf |
| Variance[i][3] | 8 | uimsbf |
| Convexity[i] | 8 | uimsbf |
| } | | |
| } | | |

FIG. 10
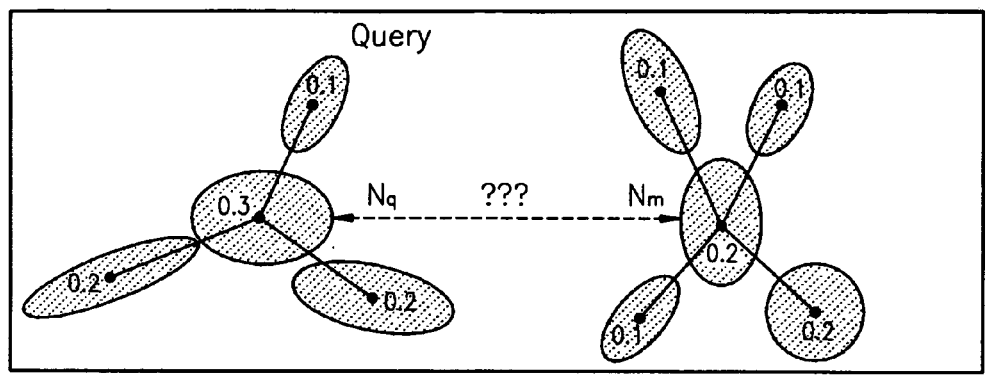
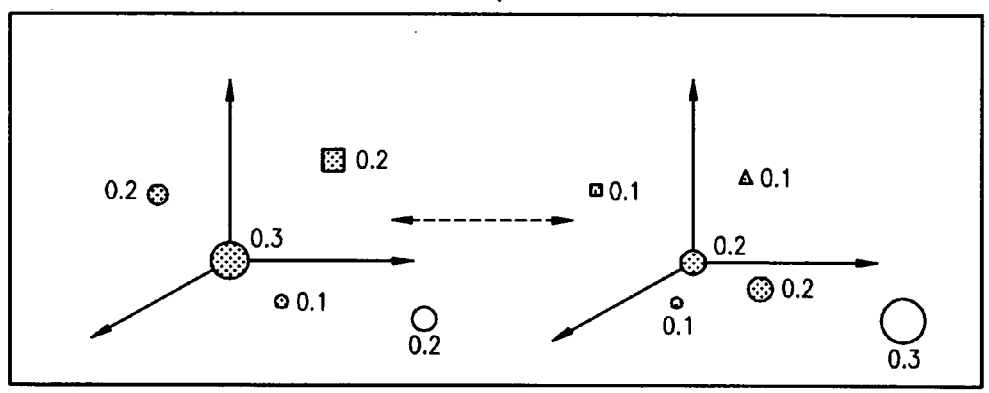
FIG. 11

(a) SKETCHED QUERY    (b) 1ST RANKED MODEL    (c) ARG FORM OF (b)

(a) 'android' MODEL
(b) 'crocodile' MODEL
(c) 'hilo' MODEL
(b) 'dinopet' MODEL
(e) 'p51_mustang' MODEL
(f) 'triceratops' MODEL (a)  (b)  (c)

| Category | | P3DS | | Shape3D | |
|---|---|---|---|---|---|
| | | BEP | ANMRR | BEP | ANMRR |
| *Aircraft* / multi_fuselages / 3_bodies | 30 | 0.63667 | 0.27326 | 0.32111 | 0.51349 |
| *Animal* / arthropod / with_wings / bee | 30 | 1.00000 | 0.00000 | 0.55556 | 0.31395 |
| *Animal* / humanoid / sitting | 60 | 0.80972 | 0.17468 | 0.55556 | 0.35739 |
| *Automobile* / tank / equipvaried | 30 | 1.00000 | 0.00007 | 0.53222 | 0.32496 |
| *Furniture* / chair / 4_legged | 30 | 0.58556 | 0.32306 | 0.34333 | 0.57811 |
| *Furniture* / chair / with_a_post | 30 | 0.68333 | 0.24401 | 0.25000 | 0.60770 |
| *Letter* / O | 15 | 0.58667 | 0.29990 | 0.32000 | 0.51549 |
| *Plant* / flower / 20_petaled | 30 | 0.66111 | 0.23978 | 0.49333 | 0.38556 |
| *Ship* / single_mast / romanship | 30 | 0.93444 | 0.05263 | 0.33778 | 0.49105 |
| *Simplex* / cellular_phone | 51 | 0.85659 | 0.11556 | 0.36332 | 0.47692 |
| Total | 336 | 0.79197 | 0.16327 | 0.42162 | 0.44626 |

METHOD OF PERCEPTUAL 3D SHAPE DESCRIPTION AND METHOD AND APPARATUS FOR SEARCHING 3D GRAPHICS MODEL DATABASE USING THE DESCRIPTION METHOD

This application claims the benefit of U.S. Provisional Application No. 60/430,974, filed on Dec. 5, 2002, and No. 60/510,147, filed on Oct. 14, 2003, in the United States Patent and Trademark Office, and Korean Patent Application No. 2003-84215, filed on Nov. 25, 2003, in the Korean Intellectual Property Office, the disclosures of which are incorporated herein in their entirety by reference.

BACKGROUND OF THE DISCLOSURE

1. Field Of the Disclosure

The present disclosure relates to a 3-dimensional (3D) graphics, and more particularly to, a method of perceptual 3D shape description and a method and apparatus for searching a 3D graphics model database established using the description method to retrieve the similar models to a query model.

2. Description of the Related Art

The number of 3D graphics objects to be managed has geometrically increased in response to the developments in 3D graphics technology and expansions in related technical fields. Therefore, there has been a need for techniques to efficiently store, manage, and reuse a number of 3D graphics objects.

According to MPEG-7, Shape3D is suggested and adopted as an international standard for 3D shape description and database searching. In general, 3D graphics models are expressed as polygonal meshes that consist of vertices and faces. Shape3D defines the shape spectrum of such polygonal meshes, which is the histogram of shape indices calculated on the whole surface of a mesh model.

However, some problems arise with Shape3D. First, the shape spectrum represents geometrical attributes of a local surface of a 3D object and cannot provide the overall, spatial information, thereby lowering shape discriminability. FIG. 1 illustrates an example of limited shape discriminability of Shape3D. In FIGS. 1(a) and (b) denote 3D objects, and (c) and (d) show the shape spectra of the objects (a) and (b), respectively. As is apparent from (a) and (b), 'android' model and 'crocodile' model have distinct shapes. However, their shape spectra are very similar to each other as shown in (b) and (d) of FIG. 1. A quantitative difference between the shape spectra of the 'android' and 'crocodile' models is merely 0.025981. In other words, when the 'android' object is used as a query for searching, the 'crocodile' object may be undesirably retrieved as one of the most similar objects, i.e., with a high similarity rank among the searched results. The searched shape has no similarity with the actual query shape. Therefore, using Shape3D is unsuitable for searching with a query by sketch or a query by editing, since there is no coherence between the actual shape and its shape spectrum.

SUMMARY OF THE DISCLOSURE

The present disclosure provides an efficient method of perceptual 3-dimensional (3D) shape description that can be applied to the management of a 3D graphics model database.

The present disclosure also provides a method and apparatus for searching a 3D graphics model database that is built up using the above method to retrieve the similar models to a query model.

In one aspect of the present disclosure, there is provided a method of perceptual 3D shape description, the method including: generating nodes that respectively correspond to parts of a part-based representation of a 3D shape model, the nodes including unary attributes of the parts; generating edges that include relational attributes between the nodes; and generating an attributed relational graph of the 3D shape model that is comprised of the nodes and the edges.

According to specific embodiments of the method, each of the nodes may be expressed as an ellipsoid parameterized by a volume, a convexity, and two eccentricities. The unary attributes of the nodes may include at least a volume, eccentricities, and a convexity. The unary attributes of each of the nodes may include variances that correspond to the degrees of distribution of voxels forming the ellipsoid on 3D principal axes, the origin of the ellipsoid, and the transformation of the node in an object-oriented coordinated system. The relational attributes may include at least the distance between nodes, the angle between the first principal axes of ellipsoids, and the angle between the second principal axes of the ellipsoids. The unary attributes of the nodes may be quantized into a predetermined number of bits.

In another aspect of the present disclosure, there is provided a computer readable medium having a perceptual 3D shape descriptor formed by the above method.

In another aspect of the present disclosure, there is a provided method of searching a database of 3D graphics models described by the above method, the searching method including: receiving input 3D graphics model; transforming the received 3D graphics model into a perceptual 3D shape descriptor; and comparing the perceptual 3D shape descriptor with each of the perceptual 3D shape descriptors of the graphics models stored in the database to retrieve the 3D graphic models that are similar to the input.

According to specific embodiments of the searching method, the receiving of the input 3D graphics model may include a user designing and inputting a 3D graphics model by means of an interactive tool. The transforming of the received 3D graphic models into the perceptual 3D shape descriptor may include a user editing the transformed 3D shape descriptor if required.

The comparing of the perceptual 3D shape descriptor with each of the perceptual 3D shape descriptors of the 3D graphics models to retrieve the 3D graphic models may include: defining the volumes of the nodes as weights; and comparing the transformed perceptual 3D shape descriptor with each of the perceptual 3D shape descriptors of the 3D graphics models stored in the database using the Double EMD (earth mover's distance) method to retrieve the 3D graphic models similar to the perceptual 3D shape descriptor. In this case, the Double EMD method includes: generating a distance matrix between query nodes of a query graph and model nodes of a model graph (Inner EMD); and measuring the similarity between the query graph and the model graph by calculating the amount of work required to move the weight (weight transition) from the query nodes to the model nodes based on the distance matrix (Outer EMD).

The generating of the distance matrix in the Inner EMD method may include: extracting the query nodes of the query graph of the perceptual 3D shape descriptor and the model nodes of the model graph of each of the 3D graphics models stored in the database and setting combinations of a particular query node and a particular model node to be compared with each other; and generating the distance matrix by measuring the distance between the query and model nodes of each of the combinations. The generating of the distance matrix by measuring the distance between the query and model nodes of each of the combinations may include: constructing a first distance matrix of the absolute values of differences between attribute vectors of the query and model nodes to calculate the distance between the query and model nodes of each of the combinations; constructing vector spaces with axes parameterized by relational attributes of the nodes; expressing the query nodes and the model nodes as sets of points in the respective vector spaces; setting an imaginary node in each of the vector spaces, the imaginary node being spaced an equal distance apart from all of the points; constructing a second distance matrix by calculating the Euclidian distances between the points in the vector spaces; and summing the first and second distance matrices to generate the distance matrix.

The measuring of the similarity between the query graph and the model graph in the Outer EMD method may comprise: calculating the amount of work required to move the weight (weight transition) from the query nodes to the model nodes based on the distance matrix and the weights of the query nodes and the model nodes; and calculating as the similarity a total amount of work for all of the nodes.

In another aspect of the present disclosure, there is provided a computer readable medium having embodied thereon a computer program for the above method of searching the perceptual 3D graphics model database.

In another aspect of the present disclosure, there is provided an apparatus for searching a database of 3D graphics models described by the description method, the apparatus including: a query input unit that receives a query that is a 3D graphics model; a model/shape descriptor transforming unit that transforms the 3D graphic model received as the query into a perceptual 3D shape descriptor; a matching unit that compares the perceptual 3D shape descriptor with each of the perceptual 3D shape descriptors of the 3D graphics models stored in the database to retrieve the models that are similar to the perceptual 3D shape descriptor; and a model output unit that outputs the retrieved models.

According to specific embodiments of the apparatus, the query input unit may allow a user to design and input the 3D graphics model by means of an interactive tool. The model/shape descriptor transforming unit may include a shape editor that allows a user to edit the perceptual 3D shape descriptor if required. The matching unit may include: a weight converter that defines the weights of the nodes as weights; and a model searcher that compares the perceptual 3D shape descriptor of a query model with each of the perceptual 3D shape descriptors of the 3D graphics models stored in the database using a Double EMD method to retrieve the models from the database that are similar to the perceptual 3D shape descriptor.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the present disclosure will become more apparent by describing in detail exemplary embodiments thereof with reference to the attached drawings in which:

FIG. 1 exemplarily illustrates a limited shape discriminability of Shape3D;

FIG. 3 illustrates an example of generating a part-based representation for a 'cow' model;

FIG. 10 illustrates vector spaces for calculating inner earth mover's distances (EMDs) and the relational attributes between nodes in the vector spaces;

FIG. 11 illustrates an example of a distance matrix constructed from the vector spaces of FIG. 10;

FIG. 16 comparatively illustrates the database search performance between the P3DS descriptor according to the present disclosure and a conventional Shape3D descriptor, which was measured by Bull's eye performance (BEP) and average normalized marching retrieval rate (ANMRR).

DETAILED DESCRIPTION OF THE DISCLOSURE

In an efficient method of 3-dimensional (3D) shape description according to the present disclosure, which can be applied to the management of a 3D graphics model database, a 3D object is transformed into a part-based representation and then an attributed relational graph (ARG) that consists of nodes and edges. This description method is very similar to the human visual perception mechanism and thus is called a 'perceptual 3D shape descriptor'.

The generation of the perceptual shape descriptor will now be described. The part-based representation of 3D shapes enable perceptual recognition of an object and is independent of rotation, translation, inhomogeneous scaling, transformation, partial deletion, etc. This part-based representation is applied to an intermediate step for high-quality 3D object shape representation. Various conventional algorithms developed so far may be categorized roughly into morphology-based decomposition and skeleton-based decomposition.

Figure 2:
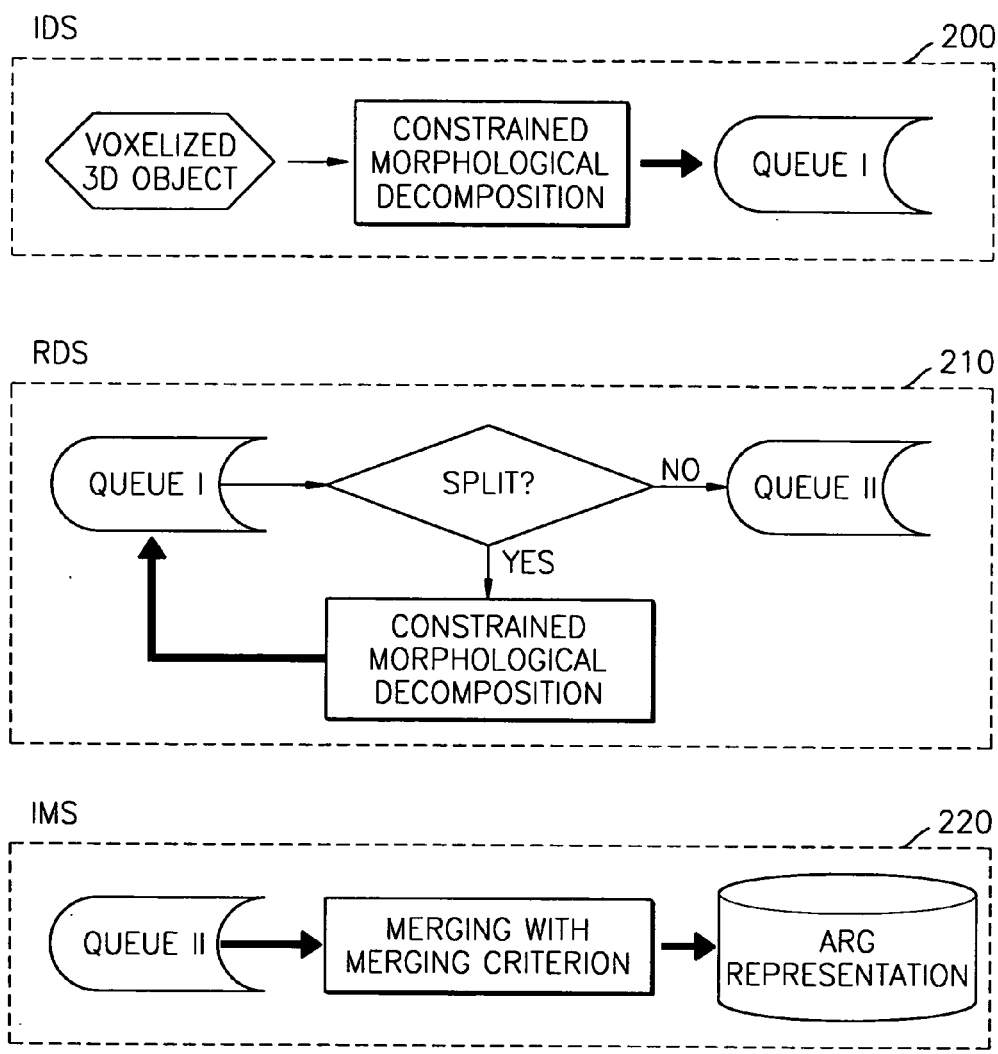
FIG. 2 illustrates a shape deposition algorithm applied in the present disclosure.

According to the present disclosure, a new algorithm is utilized to decompose the shape of a 3D object into parts. This decomposition algorithm involves recursively performing constrained morphological decomposition (CMD) using calculated mathematical morphology and weighted convexity. Next, it is determined whether to merge decomposed adjacent parts based on a weighted convexity difference (WCD). As such, the shape of the 3D object can be more adaptively and simply represented using the decomposition algorithm. The decomposition algorithm includes three stages as illustrated in FIG. 2. In FIG. 2, the arrows indicate the processing flow of binary images. A recursive decomposition stage (RDS) 210 follows an initial decomposition stage (IDS) 200 and is continued until QUEUE I is empty. Next, an iterative merging stage (IMS) 220 is performed on the decomposed parts that remain in QUEUE II for simpler, higher-quality representation. FIG. 3 illustrates step by step an example of part-based representation for a "cow") model. In FIGS. 3, (a) and (b) are meshed and voxel representations of the cow model, respectively, (c), (d), and (e) show the results of the IDS, RDS, and IMS, respectively, and (f) is a finally generated attributed relational graph (ARG) for the cow model, in which ellipsoidal nodes and edges that connect the nodes approximate corresponding decomposed parts.

Figure 4:
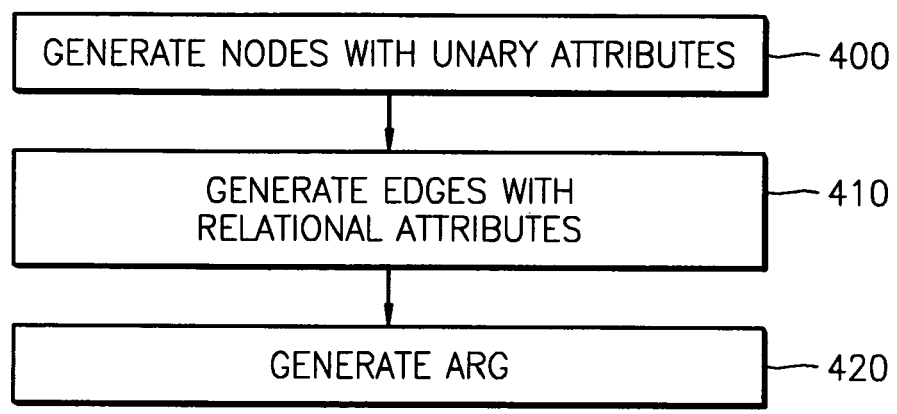
FIG. 4 is a flowchart of a method of perceptual 3D shape description according to an embodiment of the present disclosure.

FIG. 4 is a flowchart of a method of perceptual 3D shape description according to an embodiment of the present disclosure. The method roughly includes generating nodes (step 400), generating edges (step 410), and generating an ARG (step 420). In step 400, nodes that correspond to the parts of a 3D shape model in a part-based representation, respectively, and include unary attributes of the corresponding parts are generated. In step 410, edges that define relational attributes between the nodes are generated. In step 420, an ARG that consists of the nodes and the edges is represented. In particular, the perceptual 3D shape description for a given 3D model is achieved based on the above-described part-based representation. The perceptual 3D shape descriptor is represented as an ARG that consists of node and edges. The nodes of the ARG represent the decomposed parts of the 3D model and the unary attributes of the parts, and the edges represent the relational attributes between the nodes. In an embodiment according to the present, the perceptual 3D shape descriptor utilizes four unary attributes and three relational attributes that are derived from the geometric relation between the principal axes of connected nodes.

In detail, a node is represented as an ellipsoid parameterized by a volume v, a convexity c, and eccentricities e1 and e2. The convexity c is defined as the ratio of volume to convex hull of the node. When the variances of the node on first, second, and third principle axes are denoted by a, b, and c, respectively, where $a \geq b \geq c$, the eccentricities e1 and e2 are expressed as in equations (1) and (2) below.

$$e_1 = \sqrt{1 - c^2/a^2} \quad (1)$$

$$e_2 = \sqrt{1 - c^2/b^2} \quad (2)$$

Figure 5:
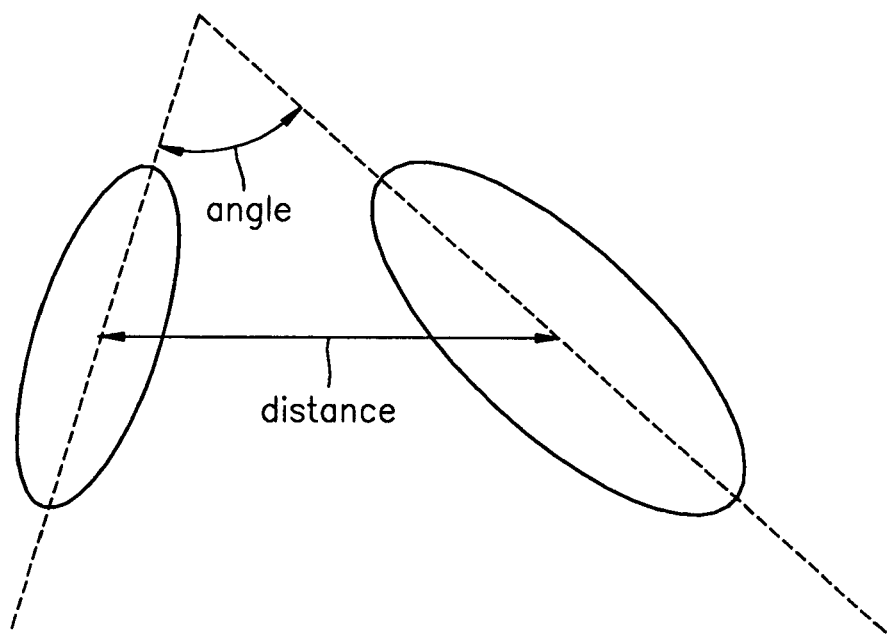
FIG. 5 illustrates edge attributes that define the relational attributes between two nodes of a perceptual 3D shape (P3DS) descriptor.

FIG. 5 illustrates edge attributes that define the relational attributes between two nodes of the perceptual shape descriptor. These edge attributes are extracted based on the geometric relation between the two ellipsoids in FIG. 5. In particular, the distance between the centers of the two ellipsoids, the angle between the first principal axes of the ellipsoids, and the angle between the second principal axes of the ellipsoids, are utilized as the edge attributes. In addition, the unary attributes of the respective nodes and the relational attributes in the edges are normalized to be within the range of from 0 to 1.

Figures 6, 7:
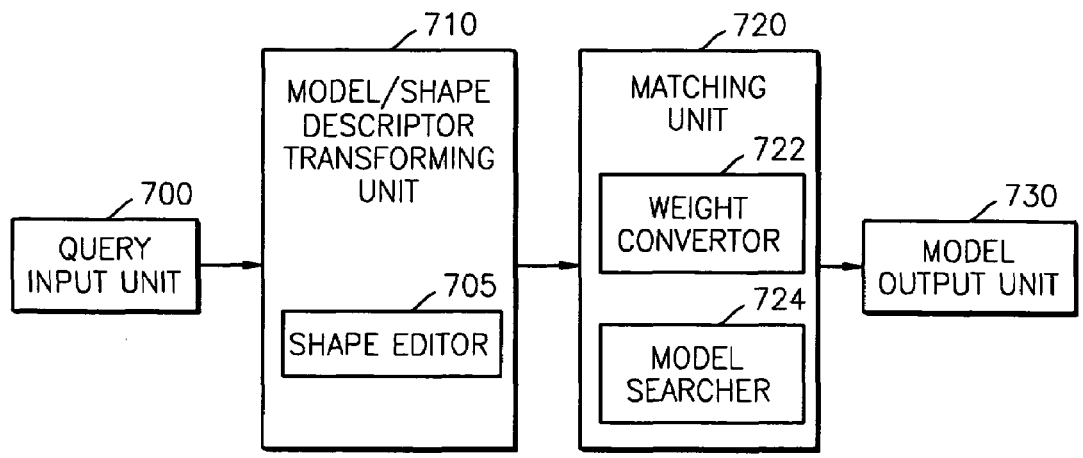
FIG. 6 is a table of binary representation form for the P3DS descriptor.
FIG. 7 is a block diagram of an apparatus for searching a database of 3D graphics models according to an embodiment of the present disclosure.

FIG. 6 is a table of binary representation form for the perceptual 3D shape (P3DS) descriptor. In FIG. 6, volume, center, partial transform in an object-oriented coordinate system, variance on each principal axis, and convexity form unary node attributes. The variance implies the degree of distribution of voxels that form an ellipsoid on each 3D principal axis. In this embodiment, the maximum number of nodes (Nnodes) that the P3DS descriptor can have was set to 32. In order to reduce the capacity of a memory to store the P3DS descriptor, each of the unary attributes was quantized into a predetermined number of bits, preferably 8 bits. With the assumption that all attributes are quantized into 8 bits as in the example of FIG. 6 and the P3DS descriptor has 5 nodes, the P3DS descriptor has a size of only 72 bytes. Alternatively, different numbers of quantization bits may be assigned to attributes. The data of a 3D shape described by the perceptual 3D shape description method according to the present disclosure may be recorded in a computer readable medium.

A method and apparatus for searching a 3D graphics model database according to the present disclosure will now be described. The 3D graphics model database stores 3D graphics models described using the above P3DS descriptor.

FIG. 7 is a block diagram of an apparatus for searching a database of 3D graphics models according to an embodiment of the present disclosure. The apparatus of FIG. 7 includes a query input unit 700, a model/shape descriptor transforming unit 710, a matching unit 720, and a model output unit 730.

The query input unit 700 receives a query that is a 3D graphics model. A user may design and input a 3D graphics model by means of an interactive tool. The model/shape descriptor transforming unit 710 transforms the 3D graphics model input as the query into the P3DS descriptor. The model/shape descriptor transforming unit 710 may include a shape editor 705 to allow the user to edit the transformed shape descriptor if necessary.

The matching unit 720 compares the transformed P3DS descriptor with each perceptual 3D shape descriptors of the 3D graphics model stored in the database to find the similar models to the transformed P3DS descriptor. The matching unit 720 includes a weight converter 722 and a model searcher 724. The weight converter 722 defines the volumes of nodes as weights. The model searcher 724 compares the transformed P3SD descriptor with each of the perceptual 3D graphics models in the database using a double earth mover's distance (EMD) method to find the similar model to the transformed perceptual 3D shape descriptor. The model output unit 730 outputs the searched similar models.

Figure 8:
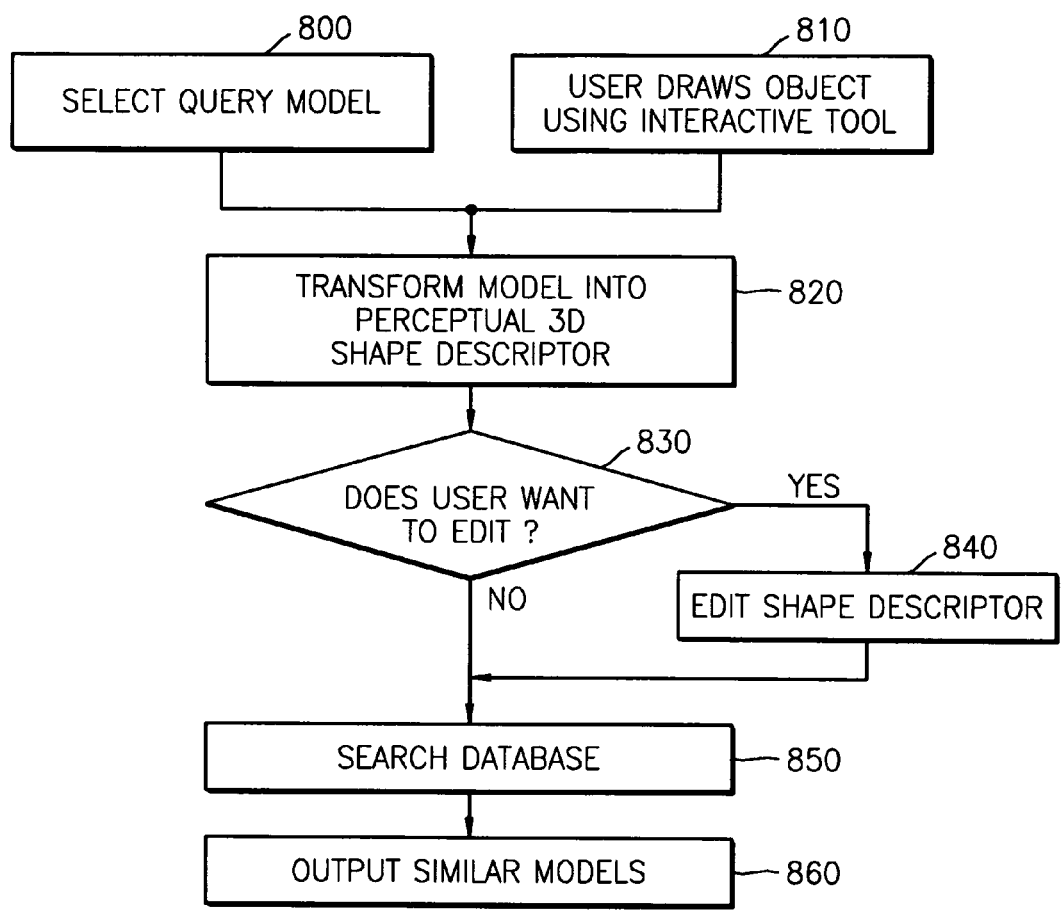
FIG. 8 is a flowchart of searching a 3D model database in the apparatus of FIG. 7 according to the present disclosure.

A method of searching a 3D model database in the above apparatus will now be described. FIG. 8 is a flowchart of searching a 3D model database in the above apparatus according to the present disclosure.

First, a query 3D graphics model is received (step 800). Alternatively, a user may draw and input a 3D graphics model as a query by means of an interactive tool (step 810). The 3D graphics model is transformed into the P3DS descriptor (step 820). If the user wants to edit the transformed P3DS descriptor (step 830), the transformed P3DS descriptor may be edited (step 840).

Next, the transformed P3DS descriptor is compared with each of the perceptual 3D shape descriptors of the 3D graphics models stored in the database to find similar models (step 850). The found similar models are output (step 860).

Figure 9:
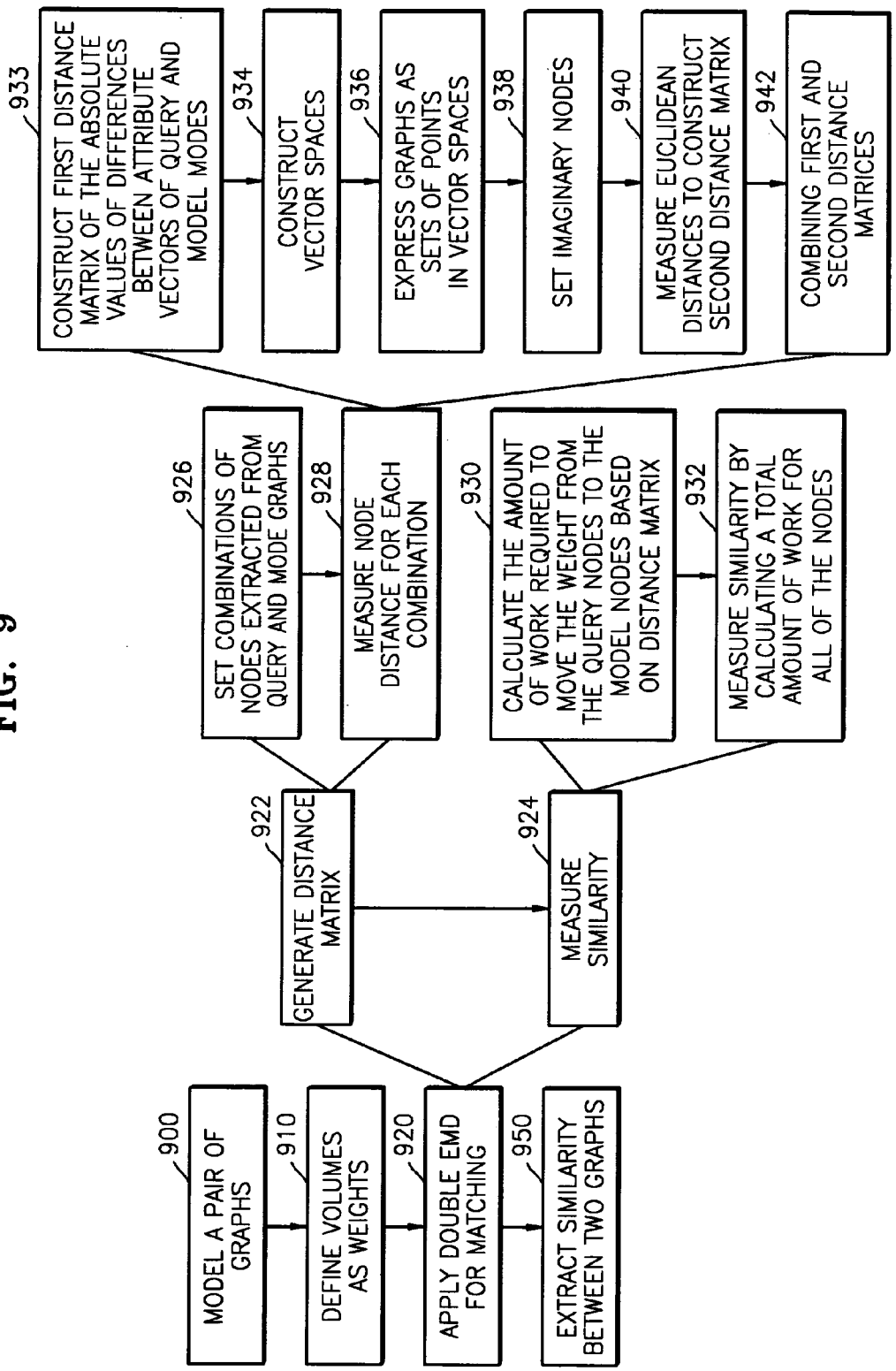
FIG. 9 is a flowchart of calculating the similarity between query and model graphs.

A process of searching the database will be described in detail with reference to FIG. 9, which is a flowchart of calculating the similarity between the query and model graphs.

Step 850 of searching the database for the similar models includes receiving a pair of graphs (step 900), defining the volumes of the nodes as weights (step 910), comparing the transformed P3DS descriptor with each of the perceptual graphics models using the double EMD method (step 920), and finding the models that are similar to the transformed P3DS descriptor (step 950).

Step 920 of the comparison using the double EMD method includes an inner EMD step of generating a distance matrix of the distances between query nodes of the query graph and model nodes of the model graph (step 922) and an outer EMD step of measuring the similarity between the query and model graphs based on the node attributes in the distant matrix (step 924).

The inner EMD step 922 includes extracting the query nodes of the query graph of the P3DS descriptor and the model nodes of the model graph of each of the perceptual 3D shape descriptors of the 3D graphics models stored in the database, setting combinations of the query and model nodes to be compared with each other (step 926), and measuring the Euclidian distance for each of the combinations to generate the distance matrix (step 928).

Step 928 of generating the distance matrix includes constructing a first distance matrix of the absolute values of differences between attribute vectors of the query and model nodes (step 933), constructing vector spaces with axes parameterized by relational attributes that are defined by the edge attributes of each of the graphs (step 934), expressing the query nodes and model nodes as respective sets of points in the vector spaces (step 936), designating an imaginary node in each of the vector spaces that is spaced the same distance apart from each of the points (step 938), calculating the Euclidian distances in the vector spaces to construct a second distance matrix (step 940), and combining the first and second distance matrices into one distance matrix (step 942).

Step 924 performed using the outer EMD includes calculating the amount of work required to transform the query graph into the model graph for each of the nodes based on the distance matrix and the weights of the nodes (step 930) and measuring the similarity between the query and model graphs by calculating a total amount of work for all of the nodes (step 932).

The double EMD method used to match the query graph with a model graph stored in the database will now be described in detail. General graph matching techniques involve three steps. The first step is to construct a distance matrix between the query nodes of the query graph and the model nodes of the model graph based on the difference in unary attribute or relational attribute between each pair of the query and model nodes. The second step is to establish the correspondence between the query and model nodes based on the distance matrix constructed in the first step. If a one-to-one mapping relation is established in the second step, generally, a bipartite matching technique is used. The last step is to extract the dissimilarity between the query and model graphs based on the differences between the corresponding query and model nodes.

Various algorithms that can be applied individually or cooperatively to each of the above steps have been developed so far. However, in order to raise the matching performance of the P3DS descriptor and use it in an actual search system, there is a need to establish a many-to-many mapping relation between the query and model nodes in the second step. In view of many-to-many mapping, more accurate matching and retrieval can be achieved when the numbers of nodes and edges are different between the query and mode graphs. The EMD method is a very useful algorithm for many-to-many mapping between the query and model nodes.

The volume, which is one of the unary attributes of the nodes, is defined as a weight in order to determine the dissimilarity between the query and model graphs using an EMD. The distance matrix that defines the correspondence of the query and model nodes is constructed using another EMD. The former EMD used to determine the dissimilarity between the query and model graphs is referred to as an outer EMD, and the latter EMD used to construct the distance matrix is referred to as an inner EMD. This matching technique involving the two steps conducted using the above EMDs is referred to as a double EMD method. A process of measuring the similarity between the query and model graphs using the double EMD method is as follows.

The inner EMD is defined as follows. The distance between an arbitrary query node $N_q$ (see FIG. 10) of a query graph and an arbitrary model node $N_m$ of the model graph is calculated as the sum of two different distances. Initially, a distance matrix is constructed of the absolute values of differences between attribute vectors of the query and mode nodes to calculate the similarity between the graphs from the node attributes. Next, vector spaces with axes parameterized by relational attributes that are defined by the edge attributes of the nodes of the corresponding graphs are constructed in order to calculate the similarity between the graphs from the edge attributes. In FIG. 10, the three axes of the coordinate system in FIG. 10 are parameterized by one distance and two angles, which belong to the relational attributes of the nodes. The arbitrary query node $N_q$ and query nodes that are connected to the arbitrary query node $N_q$ are expressed as a set of points in one of the vector spaces, and the arbitrary model node $N_m$ and model nodes that are connected to the arbitrary model node $N_m$ are expressed as a set of points in the other vector space. The arbitrary query node $N_q$ and model node $N_m$ are located at the origins of the vector spaces, respectively. An imaginary node that is spaced a constant distance d apart from the other connected nodes is set in each of the vector spaces, as denoted by blank circles in FIG. 10. This is for obtaining the sum of weights in each of the vector spaces that is equal to 1 and for preventing weight transition to nodes that are disconnected to the arbitrary query node ($N_q$) or model node ($N_m$) and do not appear in FIG. 10. In other words, for two objects to be compared that have similar connection structures but have greatly different volumes, the similarity between the objects is intentionally reduced. The distance matrix as shown in FIG. 11 is comprised of the Euclidian distances defined in the vector spaces. The distance between the arbitrary query and model nodes $N_q$ and $N_m$ can be calculated based on the weights of the nodes in FIG. 10 and the distance matrix of FIG. 11.

After calculating the inner EMD for all of the nodes in the query and model graphs, the amount of work required to move the weight (weight transition) from the query nodes to the model nodes based on the distance matrix is calculated. The dissimilarity between the query and model graphs is defined as a total amount of work for all of the nodes.

Functions of the P3DS descriptor used in the present disclosure to retrieve the similar 3D models from a database are superior to conventional methods. The most significant feature of the P3DS descriptor used in the present disclosure lies in that it perfectly matches the human shape cognition mechanism. Accordingly, it is possible to describe the topological shapes of 3D models using the P3DS descriptor according to the present disclosure and obtain proper search results. For example, if the P3DS descriptor contains information on an object that is comprised of 6 parts, for example, including a part for head, four parts for legs, and a part for tail, the object described by the P3DS descriptor may be recognized as having an animal shape and animal shapes may be retrieved from a database.

The human readability of the P3DS descriptor enables various types of shape search based on, for example, a query by sketch, a query by editing, etc. In part-based representation that is easy to build up and edit, it is allowed for a user to construct a query with more ease by expressing parts as spheres, ellipsoids, boxes, cylinders, etc, and establishing their connection relation. This constructed query is directly transformed into a P3DS descriptor and transferred to a search engine. Alternatively, the P3DS descriptor may be edited by the user in an interactive manner and applied to another type of search.

Figure 12:
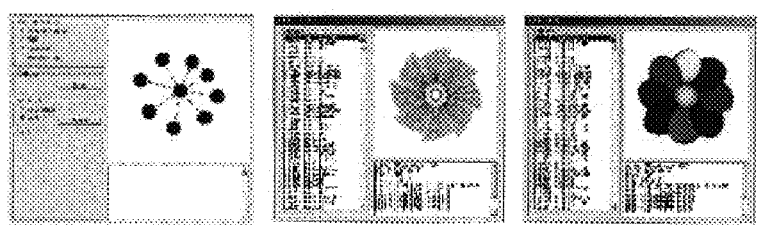
FIG. 12 illustrates an example of using a sketched query in a search system and the searched result.

FIG. 12 shows an example of a search system that utilizes sketched queries, in which (a) shows a sketched query, (b) shows the results of a retrieval that include the most similar, $1^{st}$ ranked model, and (c) shows the ARG form of the retrieved model in (b). Although not illustrated, other retrieval results with higher similarities had similar structures to (b) of FIG. 12. The user may sketch a simple topological structure by clicking on the positions of desired nodes with a mouse. The example of FIG. 12 confirms the usefulness and feasibility of the P3DS descriptor that allows the use of a sketched query.

Figure 13:
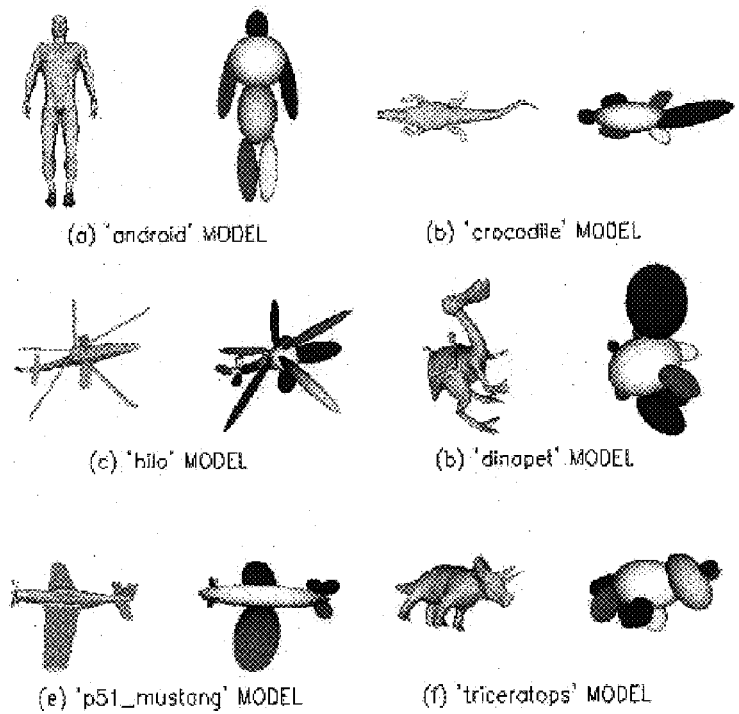
FIG. 13 illustrates original 3D mesh object models and their P3DS descriptors expressed as attributed relational graphs (ARGs)
Figure 14:
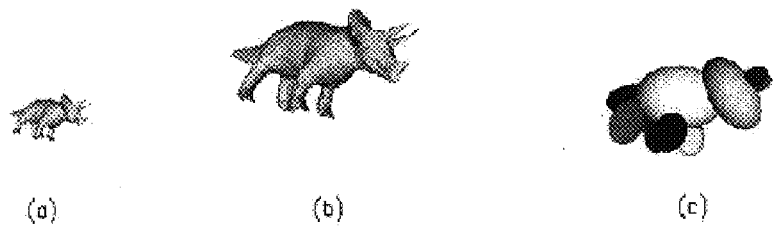
FIG. 14 illustrates an example of generating P3DS descriptors for differently sized 'triceratops' modes.
Figure 15:
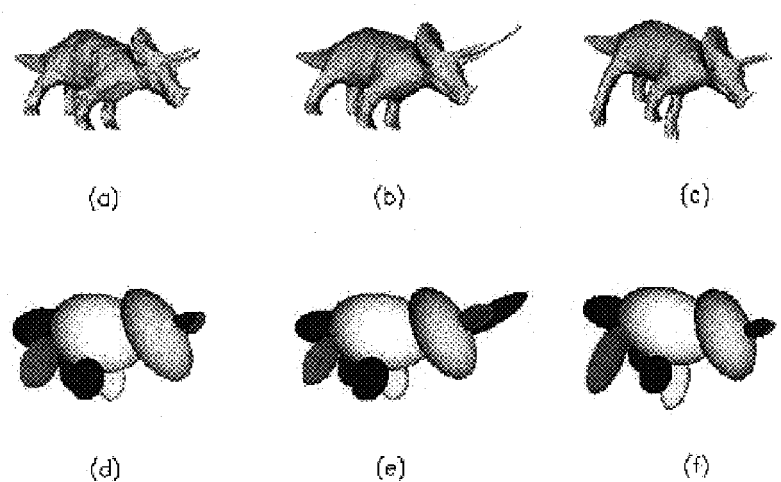
FIG. 15 illustrates examples of P3DS descriptors for 'triceratops' models one of which contains noise and the other is transformed.

The results of a simulation test performed on the perceptual 3D shape descriptor according to the present disclosure are as follows. In the simulation test, P3DS descriptors were generated. FIG. 13 shows original 3D mesh object models and their P3DS descriptors expressed in ARG forms. As is apparent from FIG. 13, there are perceptual coherences between the mesh models and P3DS descriptors. In other words, a man or a helicopter can be accurately perceived from their P3DS descriptors. In FIGS. 14,(a) and (b) are enlarged and reduced versions of the 3D object (f) in FIG. 13, respectively. However, they are expressed as the same P3DS descriptor shown in (c) of FIG. 14, independent of their sizes. FIG. 15 shows examples of P3DS descriptors when an object includes a noise component and is transformed. The object in (a) of FIG. 15 has a noise-containing vertex compared to the original 3D object in (f) of FIG. 13, the object in (b) of FIG. 15 has a longer horn than the original 3D object, and the object in (c) of FIG. 15 has longer legs than the original 3D object. As can be observed from (d), (e), and (f) of FIG. 15, the generated P3DS descriptors reflect the transformations from the original object well such a degree that the original object can be analogized from the P3DS descriptors. The above results of the simulation test indicate that the P3DS descriptor according to the present disclosure can accurately describe the shape of a 3D object independent of size variation, noise, and transformation and is perceptually coherent with the original object. In addition, the ARG representation of the P3DS descriptor can be utilized to search a 3D model database and provide searched results that coincide with the human visual perception mechanism.

A method of searching a P3DS model database according to the present disclosure will now be described. In order to evaluate the database search performance of the P3DS descriptor, a database search test was conducted using a database that is currently used by MEPG-7. The database used included 3,903 3D graphics models categorized in a 4-hierarchical structure that includes 8 top categories and 102 leaf categories. Bull's eye performance (BEP) and average normalized marching retrieval rate (ANMRR) used by MPEG-7 were applied as performance evaluation measures. A leaf category which a query model belongs to was used as a true value. A higher BEP score and a lower ANMPP score mean a more effective performance.

FIG. 16 comparatively shows the search performance between the P3DS descriptor according to the present disclosure and a conventional Shape3D descriptor for a set of 366 query models. The query models used belong to 10 selected leaf categories. As is apparent from FIG. 16, the performance of the P3DS descriptor according to the present disclosure as measured by BEP and ANMRR are excellent absolutely and over the conventional Shape3D descriptor.

As described above, a method of P3DS description according to the present disclosure enables a user to use a query by sketch or editing over conventional methods. This advantage of the present disclosure is very important in connection with contents-based database searching.

In addition, according to the present disclosure, a double EMD technique is applied to the matching of query and model representations so that a model graph similar to a query graph can be retrieved more accurately from a database.

Furthermore, according to the present disclosure, both geometric information and topological information are utilized, and the performance of the search system can be improved through many-to-many mapping of nodes between query and model graphs.

The disclosure may be embodied in a general purpose digital computer by running a program from a computer readable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of perceptual 3-dimensional (3D) shape description, the method comprising:
    generating nodes that respectively correspond to parts of a part-based representation of a 3D shape model, the nodes including unary attributes of the parts, wherein the unary attributes of the nodes comprise at least a volume, eccentricities, and a convexity;
    generating edges that include relational attributes between the nodes; and
    generating an attributed relational graph of the 3D shape model that is comprised of the nodes and the edges.

2. The method of claim 1, wherein each of the nodes is represented by an ellipsoid parameterized by a volume, a convexity, and eccentricities.

3. The method of claim 1, wherein the unary attributes of each of the nodes comprise variances that correspond to the degrees of distribution of voxels approximated by the ellipsoid on 3D principal axes, the origin of the ellipsoid, and the transformation of the node in an object-oriented coordinated system.

4. The method of claim 1, wherein the relational attributes comprise at least the distance between the centers of the ellipsoids, the angle between the first principal axes of ellipsoids, and the angle between the second principal axes of the ellipsoids.

5. The method of claim 1, wherein the unary attributes of the nodes are quantized by a predetermined number of bits.

6. A computer readable memory encoded with a computer program for creating perceptual 3-dimensional (3D) shape descriptor formed by the method according to claim 1.

7. A method of searching a database of 3-dimensional (3D) graphics models described by the method of claim 1, the method comprising:
receiving a query 3D graphics model;
transforming the received 3D graphics model into a perceptual 3D shape descriptor; and
comparing the perceptual 3D shape descriptor with each of the perceptual 3D shape descriptors of the 3D graphics models stored in the database to retrieve the 3D graphic models that are similar to the perceptual 3D shape descriptor.

8. The method of claim 7, wherein the receiving of the query 3D graphics model comprises a user designing and inputting a 3D graphics model by means of an interactive tool.

9. The method of claim 7, wherein the transforming of the received 3D graphic models into the perceptual 3D shape descriptor comprises a user editing the transformed 3D shape descriptor if required.

10. The method of claim 8, wherein the comparing of the perceptual 3D shape descriptor with each of the perceptual 3D shape descriptors of the 3D graphics models to retrieve the 3D graphic model comprises:
defining the volumes of the nodes as weights; and
comparing the transformed perceptual 3D shape descriptor with each of the perceptual 3D shape descriptors of the 3D graphics models stored in the database using a double earth mover's distance method to retrieve the 3D graphic models similar to the perceptual 3D shape descriptor,
wherein the double earth mover's distance method comprises:
generating a distance matrix between query nodes of a query graph and model nodes of a model graph; and
measuring the similarity between the query graph and the model graph by calculating the amount of work required to move the weight from the query nodes to the model nodes based on the distance matrix.

11. The method of claim 10, wherein the generating of the distance matrix comprises:
extracting the query nodes of the query graph of the perceptual 3D shape descriptor and the model nodes of the model graph of each of the 3D graphics models stored in the database and setting combinations of the query and model nodes to be compared with each other; and
generating the distance matrix by measuring the distance between the query and model nodes of each of the combinations.

12. The method of claim 11, wherein the generating of the distance matrix by measuring the distance between the query and model nodes of each of the combinations comprises:
constructing a first distance matrix of the absolute values of differences between attribute vectors of the query and model nodes to calculate the distance between the query and model nodes of each of the combinations;
constructing vector spaces with axes parameterized by relational attributes of the nodes;
expressing the query nodes and the model nodes as sets of points in the respective vector spaces;
setting an imaginary node in each of the vector spaces, the imaginary node being spaced an equal distance apart from all of the points;
constructing a second distance matrix by calculating the Euclidian distances between the points in the vector spaces; and
summing the first and second distance matrices to generate the distance matrix.

13. The method of claim 10, wherein the measuring of the similarity between the query graph and the model graph comprises:
calculating the amount of work required to move the weight from the query nodes to the model nodes based on the distance matrix and the weights of the query nodes of the query graph and the model nodes of the model graphs; and
calculating as the similarity a total amount of work for all of the nodes.

14. A computer readable memory having embodied thereon a computer program for the method according to claim 7.

15. An apparatus for searching a database of 3-dimensional (3D) graphics models that included nodes that respectively correspond to parts of a parts-based representation of a 3D shape model, the nodes including unary attributes of the parts, wherein the unary attributes of the nodes comprise at least a volume, eccentricities, and a convexity; and edges that include relational attributes between the nodes, the apparatus comprising:
a query input unit that receives a query that is a 3D graphics model;
a model/shape descriptor transforming unit that transforms the 3D graphic model received as the query into a perceptual 3D shape descriptor;
a matching unit that compares the perceptual 3D shape descriptor with each of the perceptual 3D shape descriptors of the 3D graphics models stored in the database to retrieve the models that are similar to the perceptual 3D shape descriptor; and
a model output unit that outputs the retrieved model.

16. The apparatus of claim 15, wherein the query input unit allows a user to design and input the 3D graphics model by means of an interactive tool.

17. The apparatus of claim 15, wherein the model/shape descriptor transforming unit comprises a shape editor that allows a user to edit the perceptual 3D shape descriptor if required.

18. The apparatus of claim 15, wherein the matching unit comprises:
a weight converter that defines the weights of the nodes as weights; and
a model searcher that compares the perceptual 3D shape descriptor with each of the perceptual 3D shape descriptors of the 3D graphics models stored in the database using a double earth mover's distance method to retrieve the models from the database that are similar to the perceptual 3D shape descriptor,
wherein the double earth mover's distance method comprises:
generating a distance matrix between query nodes of a query graph and model nodes of a model graph; and
measuring the similarity between the query graph and the model graph by calculating the amount of work required to transform the query graph to the model graph based on the distance matrix.

19. The apparatus of claim 18, wherein the generating of the distance matrix comprises:

extracting the query nodes of the query graph of the perceptual 3D shape descriptor and the model nodes of the model graph of each of the perceptual 3D shape descriptors of the 3D graphics models stored in the database to set combinations of the query and model nodes to be compared with each other; and constructing a first distance matrix of the absolute values of differences between attribute vectors of the query and model nodes to calculate the distance between the query and model nodes of each of the combinations;

constructing vector spaces with axes parameterized by relational attributes of the nodes;

expressing the query nodes and the model nodes as sets of points in the respective vector spaces;

setting an imaginary node in each of the vector spaces, the imaginary node being spaced an equal distance apart from all of the points;

constructing a second distance matrix by calculating the Euclidian distances between the points in the vector spaces; and combining the first and second distance matrices to generate the distance matrix, and the measuring of the similarity between the query graph and the model graph comprises:

calculating the amount of work required to transform the query graph to the model graph for each of the nodes based on the distance matrix and the weights of the query nodes of the query graph and the model nodes of the model graphs; and calculating as the similarity a total amount of work for all of the nodes.

* * * * *